United States Patent [19]

Hornsby

[11] Patent Number: 4,560,309

[45] Date of Patent: Dec. 24, 1985

[54] TWO TOOTH TAPERED REAMER

[75] Inventor: Carlton R. Hornsby, Longview, Tex.

[73] Assignee: The Oilgear Company, Milwaukee, Wis.

[21] Appl. No.: 460,815

[22] Filed: Jan. 25, 1983

[51] Int. Cl.$^4$ ............................................. B23B 51/00
[52] U.S. Cl. .................................... 408/229; 408/211; 408/223
[58] Field of Search ................ 408/118, 199, 223–230, 408/211, 227, 228; 407/54, 57, 69, 61; 145/116 R, 114; 144/219

[56] References Cited

U.S. PATENT DOCUMENTS

| 695,559 | 3/1902 | Jackmond | 408/223 X |
| 1,405,021 | 1/1922 | Skelton | 408/229 |
| 2,354,985 | 8/1944 | Davis | 408/228 |
| 3,076,356 | 2/1963 | Simich | 408/223 |
| 3,435,478 | 4/1969 | Moser | 408/199 X |
| 3,836,278 | 9/1974 | McInnes | 408/223 X |
| 4,113,405 | 9/1978 | Dillinger | 408/226 |
| 4,116,578 | 9/1978 | Gelfand et al. | 408/225 X |
| 4,134,704 | 1/1979 | Jackley et al. | 408/211 X |
| 4,225,275 | 9/1980 | Elliot | 408/229 |

FOREIGN PATENT DOCUMENTS 2602653  7/1977  Fed. Rep. of Germany ...... 408/229

OTHER PUBLICATIONS

Manufacturing Processes, Begeman et al., John Wiley & Sons, 1969, p. 469.

*Primary Examiner*—Gil Weidenfeld
*Assistant Examiner*—Glenn L. Webb
*Attorney, Agent, or Firm*—Weber, Raithel, Malm & La Fave

[57] ABSTRACT

This invention relates to a tapered finishing reamer having an overall taper of about ten degrees and having only two teeth diametrically opposite one another. Each tooth is formed to present a negative cutting angle on the order of ten degrees leading a diameter extending between the apexes of the two teeth. The tapered body of the reamer between the two teeth being cylindrical in cross-section and forms guiding surfaces of slightly less diameters than the diameter through the apexes of the teeth.

1 Claim, 5 Drawing Figures

TWO TOOTH TAPERED REAMER

SUMMARY OF THE INVENTION

Generally, reamers have more than two teeth, and the teeth each have positive cutting angles which trail behind the diameter extending between the apexes of the teeth, with attendant difficulty encountered by build-up of cutting waste in the flutes between the teeth.

The present reamer is a finishing reamer that is tapered along its length for finish reaming of a correspondingly tapered hole in a metal work product. The body of the tapered reamer defines circular cross-sections along its length interrupted by two diametrically opposite teeth and diametrically opposite flutes each of which leads a tooth with respect to a cutting direction of rotation. Each flute is formed so that its associated tooth has a negative cutting angle on the order of ten degrees. With this arrangement cutting waste readily moves outward along the flutes and does not tend to build up in the flutes or interfere with the cutting action of the reamer.

The trailing surface of each tooth recedes or is inclined about 33 degrees until it joins the circular surface of the body of the reamer between the two teeth.

The circular surfaces of the tapered reamer which lie between the two cutting teeth serve as a guide surface keeping the reamer centered in a tapered hole being finish reamed.

OBJECTS OF THE INVENTION

It is an object of the invention to provide a tapered reamer for finish reaming of a tapered hole with the reamer having only two cutting teeth each having a negative cutting angle adjoining a leading flute. The leading flute is entirely ahead of a diameter extending between the apexes of the teeth.

Another object of the invention is to provide a tapered finishing reamer constructed and arranged having two cutting teeth and two flutes which prevent cutting waste buildup in the flutes.

Another object of the invention is to provide a tapered finishing reamer having two teeth and two flutes with a substantial circular body portion between a tooth and a flute which serves to hold the reamer centered in a tapered hole.

Another object of the invention is to provide a tapered finishing reamer having tapered cylindrical surfaces which lie between the cutting teeth which restrict the reamer from pulling itself into a hole, being finished reamed, at a rate that would tend to overload the cutting teeth and cause breakage of the reamer.

THE DRAWING

DESCRIPTION

Figure 1:
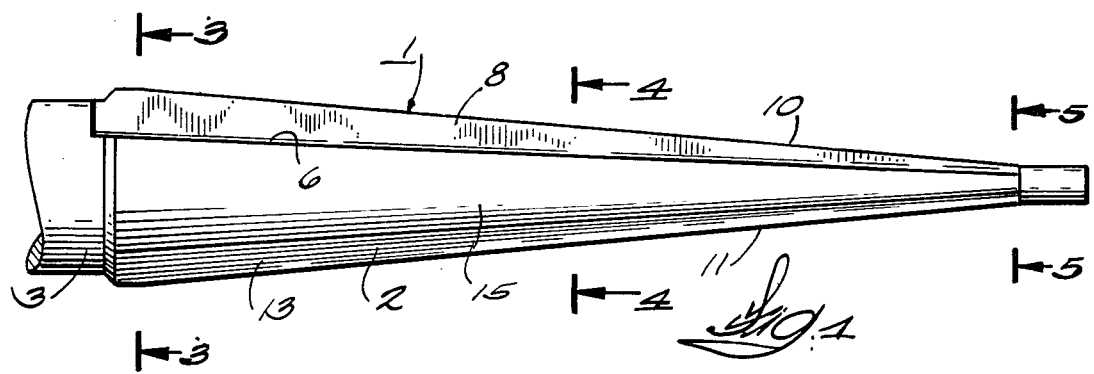
FIG. 1 shows a plan view of a tapered finishing reamer with its shank broken away.
Figure 2:
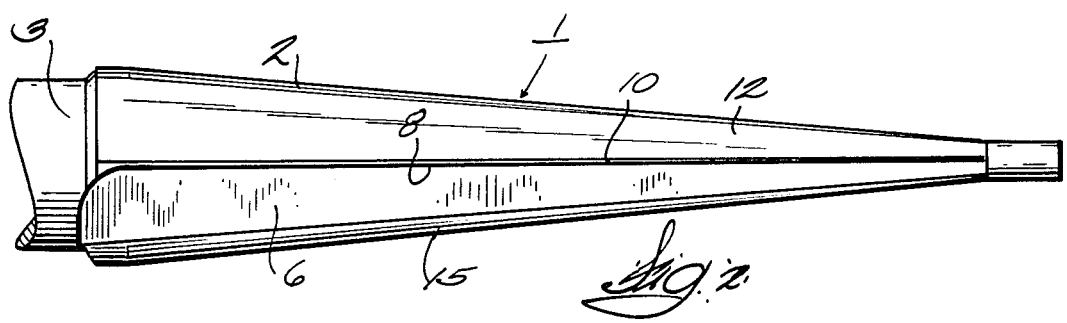
FIG. 2 shows a plan view of the reamer of FIG. 1 rotated 90 degrees.
Figure 3:
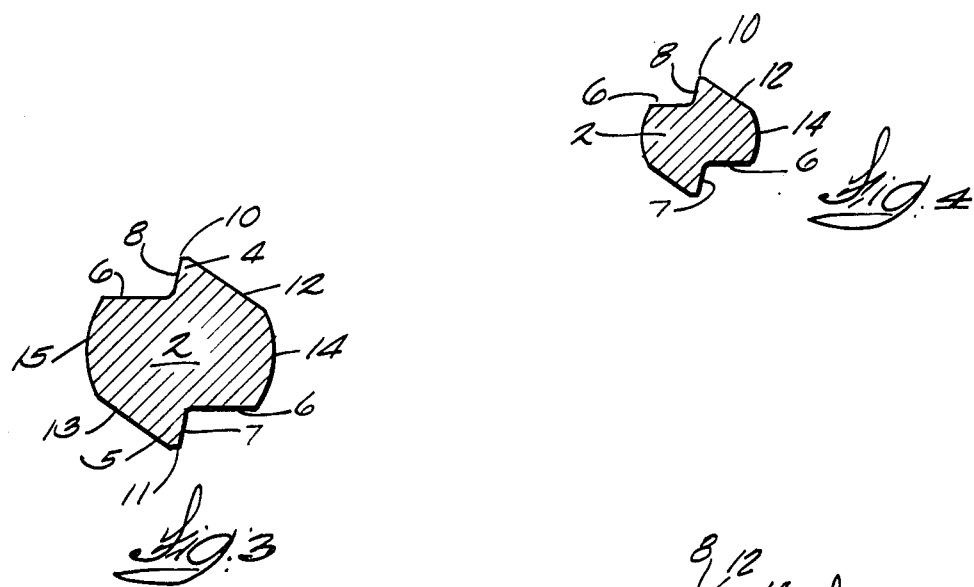
FIGS. 3, 4 and 5 show cross-sections of the reamer taken at 3—3, 4—4 and 5—5 of FIG. 1.

The tapered finishing reamers shown in the accompanying drawing is referred to herein by its reference numerals. The reamer 1 consists of a working portion 2 and a coupling shank portion 3. The construction of the body portion of the reamer is best seen in the cross-sectional views, FIGS. 3, 4 and 5, wherein the two teeth 4, 5 are diametrically opposite one another.

Leading each tooth 4,5, respectively, is a flute defined by a cutaway horizontal surface 6, and a tooth leading face 8, 7. The apexes 10,11 of the two teeth lie on a diametrical line, with the leading faces 8,7 thereof on opposite sides of this diametrical line. Each leading face makes a negative angle which leads the diametrical line between the apexes of the teeth. The negative angle of each leading face is on the order of ten degrees with the tooth diameter.

The trailing surfaces 12,13 of the teeh recede from the apexes to form surfaces inclined to a horizontal plane or to a tangent at each apex, at an angle on the order of 33 degrees. There the trailing surfaces 12,13, respectively, join the circular surfaces 14,15. The teeth thus have diametrically opposite trailing surfaces joining diametrically opposite circular surfaces, followed by diametrically opposite flutes.

Figure 4:
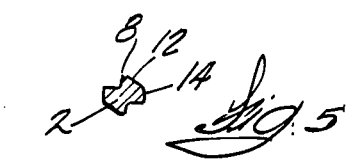
Figure 5:

The apexes 10,11 of the two teeth 4,5 are flat, in a horizontal plane in FIGS. 4, 5 and 6, or parallel to a tangent to a circle generally defining the cross-sectional configuration of the reamer, and have a width on the order of 0.01 inch, where the flattened apexes join the inclined trailing surfaces of the teeth.

The circular surfaces 14,15 lie on a circle having a diameter slightly less than the diameter of the apexes of the teeth, the difference being of the order of 0.0008 inch.

The difference in the sizes of the cross-sectional views follows the taper of the reamer, which preferably has a taper of 5 degrees with respect to its axis or which can be referred to as a 10 degree tapered reamer.

The circular surfaces 14,15 are substantial and provide a guide maintaining the reamer centered in a hole being finish reamed. The negative angle of the leading faces 8,7 of the teeth 4,5 promote the discharge of cutting waste and not the build-up cutting waste in the flutes of the reamer.

I claim:

1. A finishing taper reamer, adapted to be power driven, is tapered along its shank or working portion for finish reaming a tapered hole of corresponding taper in a metal work product; said reamer presenting cylindrical cross-sections tapering, with respect to a longitudinal axis, of five degrees or less, only two diametrically opposite teeth each having a narrow flat top surface,; each tooth being followed, with respect to a direction of rotation of said reamer, by a flat relief surface having a relief or clearance angle of approximately 33 degrees, said flat relief surface extending in a circumferential direction to a circumferential bearing surface located intermediate said teeth; said bearing surfaces providing a substantial portion of the circumference of said reamer, are substantially opposite each other, and have a diameter that is less than 0.0008 inch smaller than the diameter between the cutting edges of said teeth; said bearing surfaces are each followed by a flute extending to the next said tooth to define for the tooth a negative rake angle of approximately 10 degrees.

* * * * *